(12) United States Patent
Harder

(10) Patent No.: US 8,594,891 B2
(45) Date of Patent: Nov. 26, 2013

(54) METHOD FOR A VEHICLE STEERING USING A VEHICLE STEERING DEVICE

(75) Inventor: Michael Harder, Bodenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 223 days.

(21) Appl. No.: 13/116,145

(22) Filed: May 26, 2011

(65) Prior Publication Data

US 2011/0295465 A1 Dec. 1, 2011

(30) Foreign Application Priority Data

May 26, 2010 (DE) .......................... 10 2010 021 561

(51) Int. Cl.
| | | |
|---|---|---|
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |

(52) U.S. Cl.
USPC ................................. 701/42; 701/41; 701/43

(58) Field of Classification Search
USPC ............................................... 701/42, 41, 43
See application file for complete search history.

(56) References Cited

U.S. PATENT DOCUMENTS

| | | | | | |
|---|---|---|---|---|---|
| 6,446,749 | B2 * | 9/2002 | Hackl et al. | .................... | 180/446 |
| 6,588,770 | B1 * | 7/2003 | Lee | .............................. | 280/5.52 |
| 6,832,144 | B2 * | 12/2004 | Momiyama et al. | ............ | 701/41 |
| 7,191,048 | B2 * | 3/2007 | Aizawa et al. | ................... | 701/73 |
| 7,885,741 | B2 | 2/2011 | Fujita et al. | | |
| 2002/0029102 | A1 * | 3/2002 | Badenoch | ........................ | 701/41 |
| 2002/0195293 | A1 * | 12/2002 | Will | ............................... | 180/445 |
| 2003/0195703 | A1 * | 10/2003 | Ibrahim | ........................ | 701/301 |
| 2008/0281490 | A1 | 11/2008 | Wittig | | |
| 2009/0187311 | A1 | 7/2009 | Christiansen et al. | | |

FOREIGN PATENT DOCUMENTS

| | | |
|---|---|---|
| DE | 10114600 A1 | 1/2002 |
| DE | 10221721 A1 | 11/2003 |
| DE | 102005038390 A1 | 6/2006 |
| DE | 102007024489 A1 | 11/2008 |

(Continued)

OTHER PUBLICATIONS

German Patent Office, German Search Report for German Application No. 102010021561.9, dated Dec. 14, 2010.

(Continued)

*Primary Examiner* — Khoi Tran
*Assistant Examiner* — Nicholas Kiswanto
(74) *Attorney, Agent, or Firm* — Ingrassia Fisher & Lorenz, P.C.

(57) ABSTRACT

A method is provided for vehicle steering using a steering actuation apparatus operable by the driver. The vehicle steering device has electromechanical control assemblies for this purpose for controlling a steerable wheel, located on the right and left on a vehicle body, of a wheel pair of at least one steerable vehicle axis. A central control unit compares target value specifications of the steering actuation apparatus to ESP specifications and actual values of the wheel positions of the steerable wheels and adapts electronic specifications of the steering stops for the steerable wheels to the operating situations of the vehicle.

11 Claims, 3 Drawing Sheets

(56) References Cited

FOREIGN PATENT DOCUMENTS

| | | |
|---|---|---|
| DE | 102008055900 A1 | 6/2009 |
| DE | 102008001179 A1 | 10/2009 |
| EP | 1810912 A1 | 7/2007 |
| EP | 1990255 A2 | 11/2008 |

OTHER PUBLICATIONS

British Patent Office, British Search Report for Application No. GB1107149.5, dated Aug. 24, 2011.

\* cited by examiner

METHOD FOR A VEHICLE STEERING USING A VEHICLE STEERING DEVICE

CROSS-REFERENCE TO RELATED APPLICATION

This application claims priority to German Patent Application No. 102010021561.9, filed May 26, 2010, which is incorporated herein by reference in its entirety.

TECHNICAL FIELD

The technical field relates to a method for vehicle steering using a steering actuation apparatus operable by the driver. The vehicle steering device has electromechanical control assemblies for this purpose for controlling a steerable wheel, located on the right and left on a vehicle body, of a wheel pair of at least one steerable vehicle axis. A central control unit compares target value specifications of the steering actuation apparatus to ESP specifications and actual values of the wheel positions of the steerable wheels.

BACKGROUND

For this purpose, a vehicle steering unit and an axle steering module for a vehicle steering unit are known from the publication DE 101 14 600 A1, which have such a steering actuation apparatus, in particular a steering handwheel, and in each case have an electronic control assembly for controlling a steerable wheel, located on the right and left on a vehicle body, of a wheel pair of a steerable vehicle axle. In addition, at least one target value generator for a steering angle to be set, which is operable by the steering actuation apparatus, and an actual value generator, which at least registers one of the steering angles of the vehicle wheels, of a central control unit are known from the publication.

The vehicle steering unit and the associated method known from DE 101 14 600 A1 accordingly disclose an electronic method, which specifies and sets the respective steering angle of the steerable wheels with the aid of a central control unit, the method disclosed therein allowing, in the event of failure of a controller of one of the steerable wheels, the steering angle of the still functional controller to be transmitted to the control assembly of the failed controller by a data transmission.

In the known vehicle steering units and axle steering modules, the electronic steering stops for the steerable wheels within the surrounding wheel case are specified by so-called soft stops, which thus limit the turning circle of a vehicle, since they do not use the complete wheel clearance via the vehicle body. The wheel clearance differs depending on the lateral acceleration/travel velocity at which the vehicle travels. Normally, the wheel clearance is greater in the case of slow travel with low lateral acceleration than in the case of travel with high lateral acceleration. However, mechanical steering ranges are designed for this purpose so that the wheel moves dynamically freely, i.e., the theoretically smallest possible turning circle, for example, at a standstill of the vehicle, cannot be achieved. In addition, so-called EPS specifications (electrical power steering specifications) ensure that the electronic steering stops or soft stops only limit a further steering movement close to the mechanical end stop of the steering unit by reducing the steering support and even by active counter steering. This has the result that the turning circle of the vehicle is restricted for safety reasons.

At least one object is to provide a method for vehicle steering using a vehicle steering device, which improves the turning capability of the vehicle, in particular for parking. In addition, other objects, desirable features and characteristics will become apparent from the subsequent summary and detailed description, and the appended claims, taken in conjunction with the accompanying drawings and this background.

SUMMARY

A first embodiment provides a method for a vehicle steering using a steering actuation apparatus operable by the driver. The vehicle steering device has electromechanical control assemblies for this purpose for controlling a steerable wheel, located on the right and left on a vehicle body, of a wheel pair of at least one steerable vehicle axle. A central control unit compares target value specifications of the steering actuation apparatus to ESP specifications and actual values of the wheel positions of the steerable wheels and adapts electronic specifications of the steering stops for the steerable wheels to the operating situation of the vehicle.

This method has the advantage that the steering stops are not designed as heretofore so that the steerable wheels move dynamically freely, but rather that the smallest theoretically possible turning circle can be used, in that the electronic steering stops are adapted to the operating situation of the vehicle.

At high velocities, the ESP specifications of the electronic stability program are still decisive, which restrict the steering stops and even trigger active counter steering to limit further steering movements, so that in the case of dynamic driving operation, the engagement of lateral forces, such as centrifugal or inertial forces, on the center of gravity does not roll the vehicle or the vehicle structure around the roll axis in such a way that the driving stability of the vehicle and the suspension is no longer provided.

A further decisive delimitation of the wheel clearance in different wheel positions is the spring deflection which a wheel covers between the compressed and relaxed positions. Depending on the profile and geometry of the free space under the fender in the wheel case, it can be necessary for the steering stops of the steerable wheels to differ as a function of the spring deflection. It is to be taken into consideration that the inclination of a wheel transversely to the travel direction can be tilted outward or inward in relation to the vertical line of the vehicle, so that the wheel camber as a function of the loading of the vehicle is also to be taken into consideration in the calculation of the possible steering stops for a predefined spring deflection. Toe-in and toe-out also influence the wheel clearance and are also to be considered in the spring deflection. The inclination of the rotational axis also has a different trailing value depending on the spring deflection position. The inclination of the rotational axis of a stub axle mount in relation to the vehicle vertical line, parallel to the transverse axis of the vehicle, which defines the camber or the splay, is also to be taken into consideration in the wheel clearance and therefore for the electronic steering stops as a function of the spring deflection.

Finally, the lane difference angle, which specifies the angle difference by which the wheel on the outside of the curve is turned less than the wheel on the inside of the curve, specifies that in curves, the wheel on the inside of the curve fundamentally determines the steering stop.

These various suspension settings are taken into consideration when ascertaining the steering stops as a function of the spring deflection. In addition, when turning the wheels, the rotational angle of the vehicle around its vertical axis is to be considered and, as a function of the travel velocity, the electronic steering stops are influenced by the lateral acceleration depending on the operating situation, in order to ensure the driving stability with respect to the roll axis of the vehicle, as already mentioned above.

In a further embodiment of the method, it has the following method steps. First, the operating situation of the vehicle is ascertained. In the case of a stationary vehicle, the spring deflection of the steerable wheels is ascertained in consideration of the above-mentioned suspension setting and a maximization of the electronic specifications of the steering stops of the steerable wheels is performed as a function of the spring deflection. The advantage is connected thereto that the smallest possible steering circle can be used, in particular when parking vehicles or when maneuvering in narrow spaces.

In the case of a moving vehicle, the yaw angle of the vehicle is first ascertained. If the yaw angle is equal to zero in the case of a moving vehicle, the previously ascertained electronic specifications of the steering stops of the steerable wheels can be maintained. In the case of a yaw angle greater than zero and a moving vehicle, the lateral acceleration is to be ascertained. In the case of a lateral acceleration close to zero and a yaw angle greater than zero with a moving vehicle, this means that the vehicle is in a parking state or in another maneuvering state, so that again in consideration of the ascertained spring deflection of the steerable wheels, a maximization of the electronic specifications of the steering stops of the steerable wheels is performed as a function of the spring deflection.

In the case of lateral accelerations greater than zero and a yaw angle greater than zero, in the case of a moving vehicle, ascertaining the travel path of the steerable wheels is also indispensable and the electronic specifications of the steering stops are subsequently adapted as a function of the spring deflection and according to the ESP specifications. Subsequently, the electronic specifications of the steering stops are output to each of the steerable wheels.

This method has the advantage that electronic steering stops are thus adapted to the respective operating situation of the vehicle and, depending on the operating situation, the smallest possible turning circle and the greatest possible wheel clearance of the vehicle are ensured both in dynamic operation and also in stationary operation.

During parking of a vehicle, it is taken into consideration that the operating situations of the vehicle change from a stationary vehicle to a moving vehicle and vice versa with minimal lateral acceleration and maximal yaw angles. In the operating situation of the traveling vehicle, yaw angle ranges occur between zero and maximum yaw angles, which are restricted by ESP specifications, as a function of the lateral acceleration and the location of the roll axis of the vehicle, so that with increasing lateral acceleration, the electronic steering stops are reduced and therefore the turning circle becomes larger.

Finally, in the operating situation of cornering, the steerable wheel on the inside of the curve will determine, with its spring deflection, the electronic specification of the steering stops in consideration of the ESP specifications for the steerable vehicle axle, particularly because the inner steerable wheel is turned more strongly as a result of the lane difference angle than the outer steerable wheel during cornering.

To ascertain the lateral acceleration, a three-dimensional acceleration sensor is activated, so that the steering stops and therefore the steering range of the steerable wheels can reliably be reduced with increasing lateral acceleration to advantageously ensure the driving stability, even if the vehicle steering unit specifies a greater steering angle via the steering actuation apparatus than the target value.

To ascertain the yaw angle, the rotational angle of the vehicle around the vertical axis is calculated from the actual value of the angle of the wheel position of the steerable wheels relative to a vehicle longitudinal axis of the vehicle. Therefore, the electronic steering stop can be provided accordingly depending on the operating situation.

A second embodiment provides a vehicle steering device having a steering actuation apparatus operable by the driver. The vehicle steering device has electromechanical control assemblies for this purpose for controlling a steerable wheel, located on the right and left on a vehicle body, of a wheel pair of at least one steerable vehicle axis. A central control unit has ascertainment devices and comparison devices, which analyze the target value specifications of the steering actuation apparatus in comparison with ESP specifications and actual values of the wheel positions of the steerable wheels and adapt electronic specifications of steering stops for the steerable wheels as a function of the operating situation of the vehicle.

The vehicle steering device having its ascertainment devices and comparison devices in a central control unit, has the advantage that depending on the operating situation of the vehicle, the electronic specifications of steering stops for the steerable wheels differ in such a way that in each case the smallest possible turning circle is allowed for the individual operating situations, while ensuring the wheel clearance and the driving stability of the vehicle.

In a further embodiment, the vehicle steering device has a first ascertainment device, implemented to ascertain an operating situation of the vehicle. It is ensured by a second ascertainment device, which is implemented to ascertain a currently permissible spring deflection of steerable wheels of the vehicle, that in greatly varying wheel positions with greatly differing spring deflection, the different suspension settings for the wheel stop are taken into consideration A third embodiment is implemented to ascertain the yaw angle of the vehicle, and a fourth ascertainment device is implemented to ascertain a lateral acceleration of the vehicle. Furthermore, at least three comparison devices are used, a first comparison device being implemented to differentiate between stationary vehicle and moving vehicle. A second comparison device is implemented to differentiate between a yaw angle equal to zero and a yaw angle greater than zero. Finally, a third comparison device is implemented to differentiate between a lateral acceleration equal to zero and a lateral acceleration greater than zero. In addition to these ascertainment devices and comparison devices, the electronic vehicle steering device has an output device, which is implemented to automatically output electronic specifications of the steering stops of the steerable wheels of the vehicle steering device, which are adapted to the operating situations of the vehicle.

The ascertainment devices and the comparison devices as well as the output device can be a central component of the central control unit or can be situated distributed in a decentralized way in the vehicle and can exchange corresponding sensor and control data via a CAN bus. In addition, in a further embodiment of the application, an ESP is provided to the central control unit, which specifies limits for yaw angle and lateral acceleration in the case of moving vehicles.

A third embodiment provides a computer program which, when it is executed on a processor of a central control unit for adaptation of electronic specifications of the steering stops of steerable wheels of a vehicle steering device, instructs the control unit to execute the following steps: ascertaining an operating situation of the vehicle, ascertaining a currently permissible spring deflection of the steerable wheels of the vehicle, ascertaining a yaw angle of the vehicle, ascertaining a lateral acceleration of the vehicle, differentiating operating situations between stationary vehicle and moving vehicle, differentiating between a yaw angle equal to zero and a yaw angle greater than zero, differentiating between a lateral acceleration equal to zero and a lateral acceleration greater than zero, and automatically outputting electronic specifications of the steering stops of the steerable wheels of the vehicle steering device which are adapted to the operating situations of the vehicle.

Using such a programmed processor of the control unit of the vehicle steering device, it is possible in connection with a computer-readable medium, on which a corresponding computer program is stored, both in the case of a stationary vehicle or minimal travel velocity and also in the case of high travel velocities, to maintain the safety with respect to electronic steering stops, which are essentially limited by ESP specifications and spring deflection possibilities, with the smallest possible turning circle.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
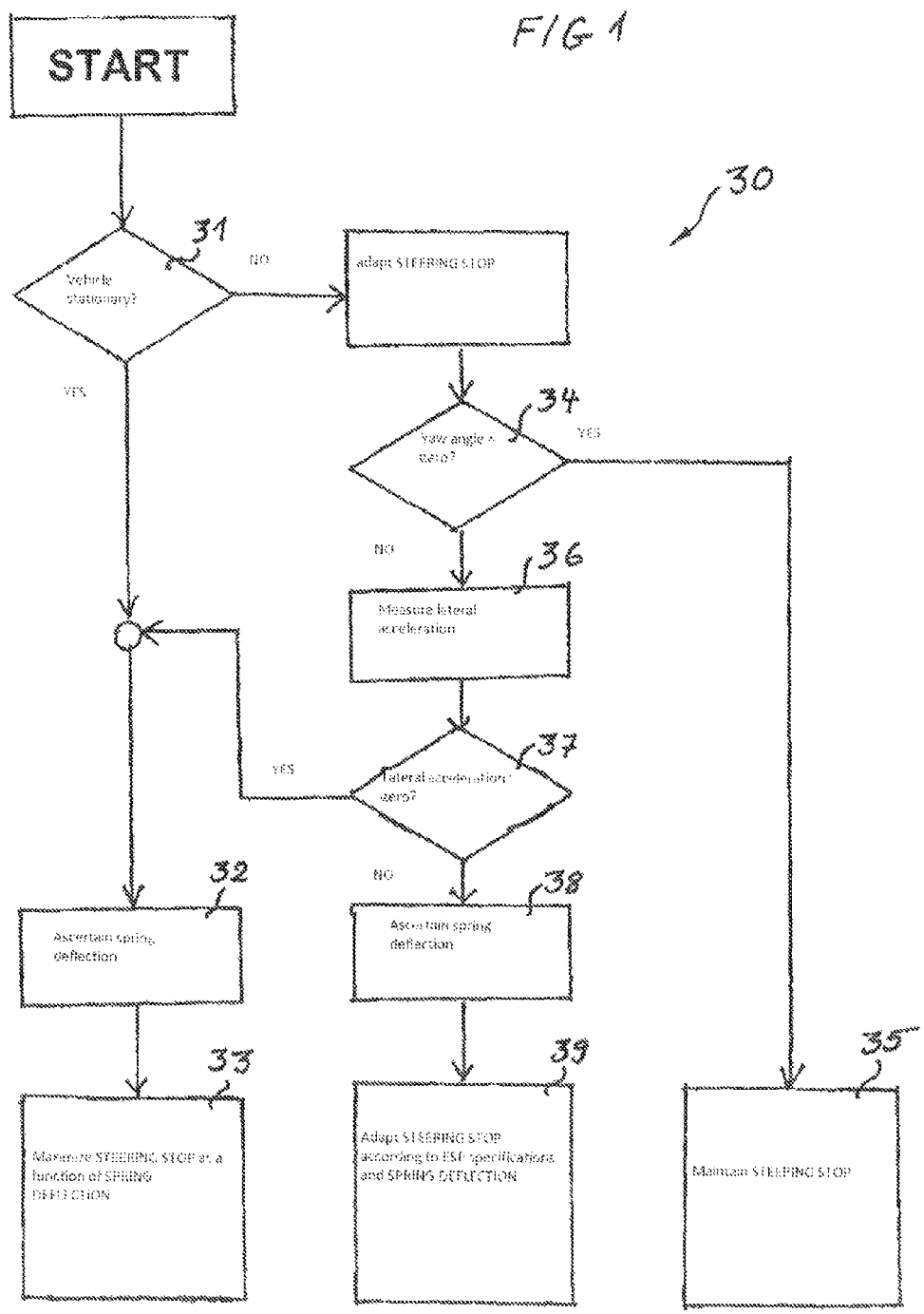
FIG. 1 schematically shows a flow chart to perform a method for vehicle steering according to an example of the application.

FIG. 1 schematically shows a flow chart 30 for performing a method for vehicle steering according to an example of the application. After a start, the operating state of the vehicle is initially established in a first method step 31. If the vehicle is stationary, the spring deflection is next ascertained in a second method step 32 in consideration of the various suspension settings and finally, in a third method step 33, steering stops are maximized and output as a function of the respective spring deflection. Is thus possible when maneuvering in a very narrow space or when parking to provide the smallest possible turning circle to the driver.

If the vehicle is moving, the steering stops are adapted in further method steps. In a fourth method step 34, the yaw angle is first ascertained. If this yaw angle is equal to zero, the steering stops can be maintained in a final fifth method step 35. However, if the yaw angle is not equal to zero, the lateral acceleration of the vehicle is measured in a sixth method step 36

It is studied in a seventh method step 37 whether the lateral acceleration is close to zero, so that the spring deflection at a standstill can again be ascertained according to the second method step 32 and the third method step 33 then follows, in which the steering stops are maximized as the function of the spring deflection. However, if the lateral acceleration is significantly greater than zero, the spring deflection is ascertained for the corresponding cornering in an eighth method step 38 and the steering stops are subsequently adapted to this operating situation of the vehicle in a ninth method step 39 according to the respective ESP specifications and the ascertained spring deflection.

Figure 2:
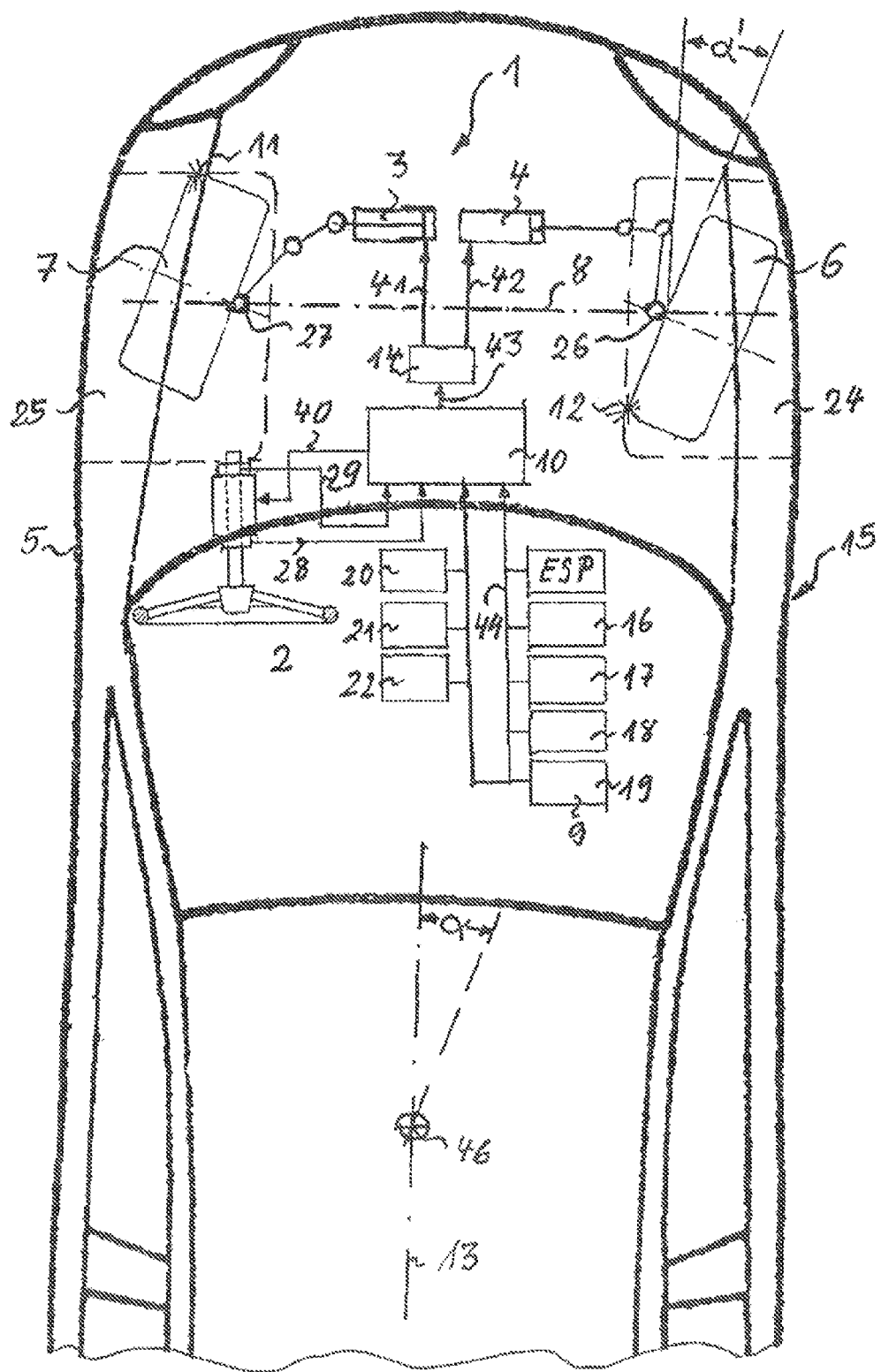
FIG. 2 shows a schematic block diagram of a vehicle steering device according to an embodiment of the application.

Such a method, as is shown by the flow chart 30 in FIG. 1, can be executed using a device as shown in FIG. 2. FIG. 2 shows a schematic block diagram of a vehicle steering device 1 in a vehicle body 5 according to an embodiment. The steerable wheels 6 and 7 are schematically shown in the vehicle 15 in an extreme steering stop for this purpose, so that the steerable wheel 6 of the steerable vehicle axle 8 displays a maximum steering stop 12 and the steerable wheel 7 of the steerable vehicle axle 8 displays a maximal steering stop 11. The wheel clearance is still ensured in the case of these maximal steering stops 11 and 12. This wheel clearance can change with increasing positive spring deflection within the wheel case 24 or 25, respectively, however, so that different maximal steering stops result as a function of the spring deflection.

The possible steering stops for the steerable wheels 6 and 7 are output by a central control unit 10 via a data line 43 to an output device 14 and therefrom via control lines 41 and 42 to electromechanical control assemblies 3 and 4. The central control unit 10 receives target specifications of a steering actuation apparatus 2, which interacts via a feedback line 40 with the central control unit 10, via signal lines 28 and 29.

In addition, in the central control unit 10, a first ascertainment device 16 for the operating situation, a second ascertainment device 17 for the spring deflection, a third ascertainment device 18 for the yaw angle, and a fourth ascertainment device 19 for the lateral acceleration interact via a corresponding CAN bus 44. Furthermore, a first comparison device 20 for the comparison of operating situations, a second comparison device 21 for the comparison of yaw angles, and a third comparison device 22 for the comparison of lateral accelerations are connected to the CAN bus 44. The rotational angle around the vertical axis 46 of the vehicle or the yaw angle $\alpha$ in relation to the longitudinal axis 13 of the vehicle 15 is derived from the turning angle $\alpha'$ of the steerable wheels 6 or 7. The lateral acceleration can be ascertained with the aid of a three-dimensional acceleration sensor 9.

Figure 3:
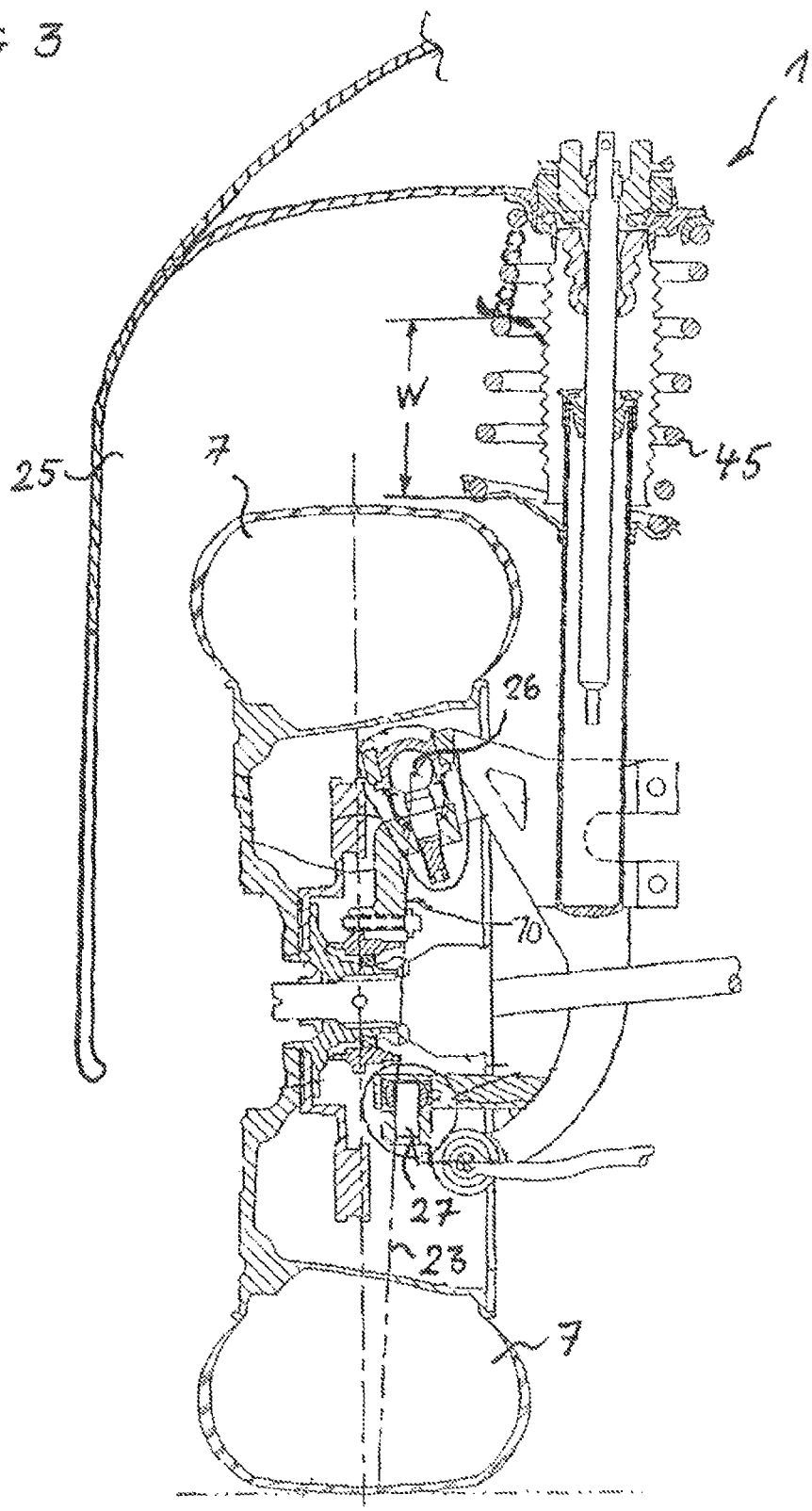
FIG. 3 shows a schematic cross-section through a steerable wheel inside a wheel case, which delimits the electronic steering stops.

FIG. 3 shows a schematic cross-section through a steerable wheel 7 inside a wheel case 25, which delimits the electronic steering stops. When the steerable wheel 7 is turned, it rotates around a rotational axis 23 of stub axle mounts 26 and 27. Furthermore, a spring deflection w of the wheel spring 45 is covered when the suspension is loaded by loading the vehicle. The spring deflection w shown here is the maximum possible spring deflection, which is only used or occurs in the case of dynamic overload of the vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A steering apparatus for a vehicle, comprising:
    a steering actuation apparatus operable by a driver;
    electromechanical control assemblies configured to control a steerable wheel pair having a first wheel located on a right side and a second wheel located on a left side of a vehicle body, each of the first wheel and the second wheel associated respectively with a first steering stop and a second steering stop, the first wheel and second wheel connected to a steerable vehicle axis; and
    a central control unit that:
        ascertains an operating situation of the vehicle;
        ascertains a spring deflection of the first wheel and the second wheel in a case of the vehicle having a stationary operating situation;
        maximizes the electronic specifications of the first steering stop and second steering stop of the respective first wheel and second wheel as a function of the spring deflection;
        ascertains a yaw angle of the vehicle when the vehicle has a moving operating situation;
        maintains the electronic specifications of the first steering stop and second steering stop of the respective first wheel and second wheel in a third case when the yaw angle is equal to zero and the vehicle has a moving operating situation;
        ascertains a lateral acceleration in a fourth case when the yaw angle is greater than zero and the vehicle has a moving operating situation;
        ascertains the spring deflection of the first wheel and the second wheel and maximizes the electronic specifications of the first steering stop and second steering stop of the respective first wheel and second wheel as the function of the spring deflection in a fifth case when the lateral acceleration is close to zero and the yaw angle is greater than zero with the vehicle having a moving operating situation;
        ascertains the spring deflection of the first wheel and the second wheel and adjusts the electronic specifications of the first steering stop and second steering stop as the function of the spring deflection and according to the ESP specifications when the lateral acceleration is greater than zero and the yaw angle is associated with the vehicle having a moving operating situation.

2. The steering apparatus according to claim 1, wherein, during parking of the vehicle, the operating situation of the vehicle changes from a stationary vehicle to a moving vehicle and vice versa with minimal lateral acceleration and maximal yaw angles.

3. The steering apparatus according to claim 1, wherein, the vehicle has the operating situation of the moving, the yaw angle is in a range between zero and maximal yaw angles, which are restricted by the ESP specifications, and occur as a second function of the lateral acceleration and a location of a roll axis of the vehicle.

4. The steering apparatus according to claim 1, wherein, the vehicle has the operating situation of cornering, and the respective one of the first wheel and the second wheel on the inside of a curve defines an electronic specification of a respective one of the first steering stop and second steering stop based on a spring deflection and the ESP specifications for the steerable vehicle axis.

5. The steering apparatus according to claim 1, wherein a three-dimensional acceleration sensor is activated to ascertain the lateral acceleration.

6. The steering apparatus according to claim 1, wherein a rotational angle of the vehicle around a vertical axis is calculated to ascertain the yaw angle from an actual value of an angle of a wheel position of the first wheel and the second wheel relative to a vehicle longitudinal axis of the vehicle.

7. A vehicle steering device, comprising:
    a steering actuation apparatus operable by a driver;
    electromechanical control assemblies configured to control a steerable wheel having a first wheel located on a right side and a second wheel located on a left side of a body of a vehicle to form a wheel pair;
    a steerable vehicle axis;
    a first ascertainment device that ascertains an operating situation of the vehicle;
    a second ascertainment device that ascertains a current spring deflection of the first wheel and the second wheel of the vehicle;
    a third ascertainment device that ascertains a yaw angle of the vehicle;
    a fourth ascertainment device that ascertains a lateral acceleration of the vehicle;
    a first comparison device that differentiates between a stationary vehicle and a moving vehicle;
    a second comparison device that differentiates between the yaw angle equal to zero and the yaw angle greater than zero;
    a third comparison device that differentiates between the lateral acceleration equal to zero and the lateral acceleration greater than zero; and
    a central control unit that analyzes a plurality of target value specifications of the steering actuation apparatus by comparison with a plurality of ESP specifications and a plurality of actual values of wheel positions of first wheel and the second wheel and adapts electronic specifications of a first steering stop and a second steering stop for the first wheel and the second wheel based on the operating situation of the vehicle, the current spring defection of the first wheel and the second wheel, the yaw angle of the vehicle and the lateral acceleration of the vehicle,
    wherein if the yaw angle is greater than zero, the lateral acceleration is close to zero and the operating situation of the vehicle is moving, the electronic specifications of the first steering stop and the second steering stop are maximized based on the current spring deflection of the first wheel and the second wheel.

8. The vehicle steering device according to claim 7, wherein the comparison devices are at least partially situated in the central control unit.

9. The vehicle steering device according to claim 8, wherein the central control unit comprises an ESP that is configured to specify limits for the yaw angle and the lateral acceleration for the moving vehicle.

10. The vehicle steering device according to claim 7, wherein the central control unit is connected for signal exchange via a CAN bus to the ascertainment devices.

11. A non-transitory computer readable medium embodying a computer program product, said computer program product comprising:
    a program for an adaptation of electronic specifications of a first steering stop and a second steering stop of a respective first wheel and a second wheel of a vehicle steering device and configured to:
    ascertain an operating situation of a vehicle;
    ascertain a currently permissible spring deflection of the first wheel and the second wheel of the vehicle;
    ascertain a yaw angle of the vehicle;
    ascertain a lateral acceleration of the vehicle;

differentiate operating situations between stationary vehicle and moving vehicle;
differentiate between the yaw angle equal to zero and the yaw angle greater than zero;
differentiate between the lateral acceleration equal to zero and the lateral acceleration greater than zero; and
output electronic specifications of the first steering stop and second steering stop based on the operating situation of the vehicle, the currently permissible spring deflection, the yaw angle of the vehicle and the lateral acceleration of the vehicle to the vehicle steering device.

* * * * *